April 5, 1966   J. J. WALSH ETAL   3,244,953
WOUND CAPACITOR HAVING HERMETICALLY SEALED TERMINALS
Filed Feb. 8, 1965

James J. Walsh
Jones & Mushkin
INVENTOR.
BY Ralph Hammar
Attorney

United States Patent Office 3,244,953
Patented Apr. 5, 1966

3,244,953
WOUND CAPACITOR HAVING HERMETICALLY SEALED TERMINALS
James J. Walsh and Forrest T. Mullikin, Erie, Pa., assignors to Erie Technological Products, Inc., Erie, Pa., a corporation of Pennsylvania
Filed Feb. 8, 1965, Ser. No. 430,849
2 Claims. (Cl. 317—260)

This invention is a wound capacitor having a tubular thermoplastic case hermetically sealed to cup shaped end caps at opposite ends. In a preferred form, the plastic case comprises several layers of thermoplastic such as Mylar tightly wrapped about the capacitor and fused to each other and the end caps are metal cups of inside diameter less than the outside diameter of the plastic case which are heated above the melting point of the plastic and pressed onto the ends of the capacitor. As the end caps are assembled, the plastic in contact with the end caps melts and flows into intimate contact with the inner surface of the electrodes and also provides beads of molten plastic adjacent the rims of the end caps which, upon cooling, shrinks into place and provides hermetic seals for the associated ends of the capacitor. If the capacitor electrodes are tin foil and the end caps are suitably tinned, the contact of the end caps with the foil effects a soldered connection to the capacitor electrodes. The end caps have an interference or shrink fit on the ends of the capacitor.

Figure 2:
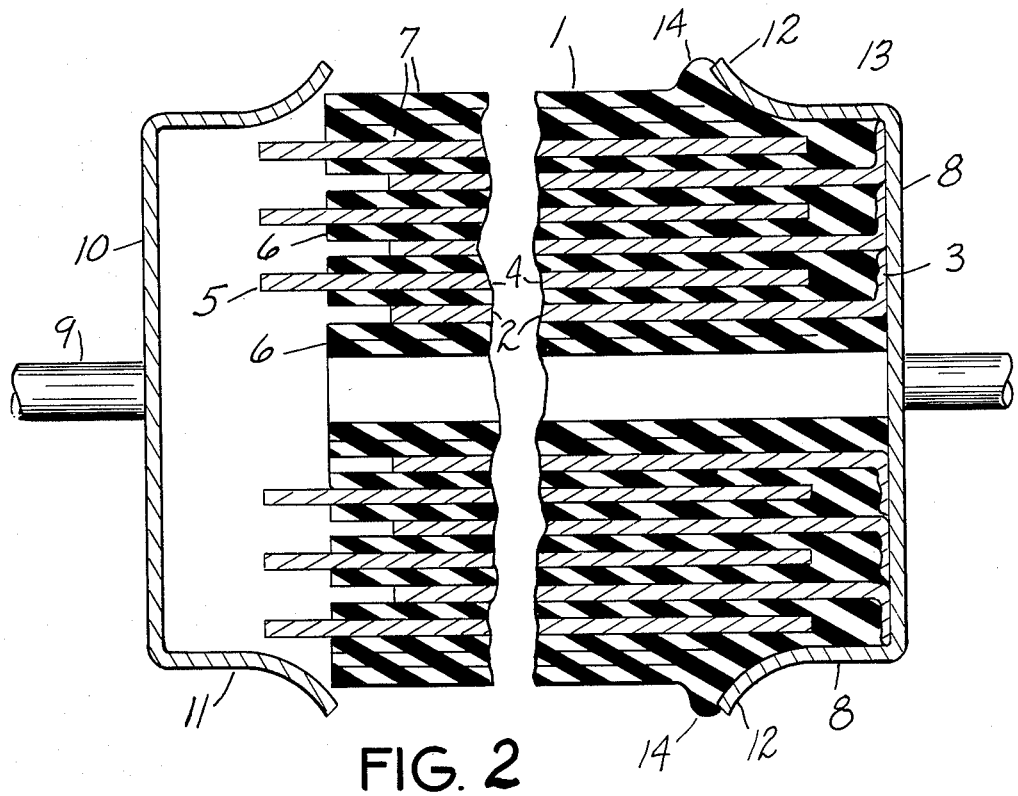
Figure 1:
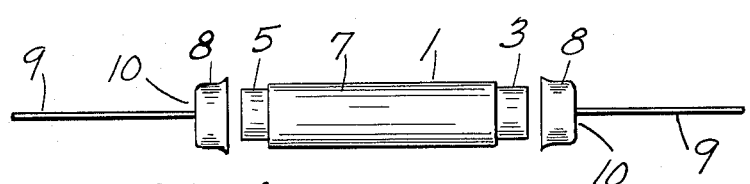

In the drawing, FIG. 1 is an exploded view of a wound capacitor and the associated caps and leads, and FIG. 2 is a diagrammatic longitudinal section showing one end cap assembled and the other end cap in position for assembly onto the capacitor.

Wound capacitors have been made for many years and typically consist of a body of alternate tightly wound convolutions of metal and dielectric film with one electrode connection at one end of the body and the other electrode connection at the other end of the body. Typical dielectrics are paper and heat softening plastics such as Mylar or polyesters or polyvinyl resins. Typical electrode metals are tin or aluminum, either as separate foils or as metallized layers on the dielectric sheets. The electrodes are in capacitive relation at the center of the body and are insulated from each other by the dielectric. The parts so far described are of common construction and are readily identified in FIG. 2, where 1 indicates the body of tightly wound metal and dielectric convolutions, 2 indicates one of the metal electrodes having an extension 3 at the right end, 4 indicates the other metal electrode having an extension 5 at the left end and 6 identifies the dielectric sheets separating the electrodes 2 and 4. While the preferred electrode material is tin foil and the preferred dielectric material is Mylar, there is no reason why any of the electrode and dielectric materials for wound capacitors may not be used.

The case for the capacitor comprises a tubular thermoplastic section 7 open at both ends and having its ends closed by cup shaped end caps 8. When the dielectric material 6 is thermoplastic, the tube 7 conveniently comprises several layers of plastic wound around the body of the capacitor in direct continuation of the layers 6 and fused to each other to the extent necessary to provide a hermetic seal between the layers. The tubular section 7, however, may comprise a different thermoplastic, in which case it is separately applied after the capacitor is wound. In either case the capacitor has a tight fit in the bore of the section 7. The end caps 8 are preferably imperforate tinned metal having lead wires 9 welded to the bottom wall 10. The side and bottom walls of the end caps 8 are imperforate and when sealed to the ends of the plastic case 7 as hereafter described, provide a hermetically sealed capacitor which requires no external protective coating.

To obtain the hermetic seal between the end caps 8 and the plastic casing 7, the end caps 8 are deliberately made undersize so the side walls 11 do not have a sliding fit on the ends of the plastic case. The walls 11 have a force or interference or shrink fit on the ends of the plastic case. In the usual small size capacitors, making the inside diameter of the end caps .005″ less than the nominal outside diameter of the plastic case 7 will insure the desired shrink fit on all capacitors even though variations in the thickness of the metal and dielectric causes variation in the outside diameter of the capacitors. The end caps 8 further have outwardly flaring rims 12 which have a maximum inside diameter which is oversize with relation to the outside diameter of the associated end of the plastic case 7. This means that as the assembly of the end caps starts, the rims 12 are easily positioned on the ends of the body of the capacitor in engagement with the end of the plastic case 7. The end caps 8 are heated prior to assembly well above the melting point of the plastic case and are forced onto the ends of the plastic case 7 while hot. As the end caps are forced into place, there is a melting or fusion of the plastic, causing it to flow into a solid mass, as indicated at 13, and further causing a bead 14 to form beneath the rim 12 of the end cap. As this bead 14 cools, it shrinks into the space between the rim 12 and the plastic case 7, still further tightening the seal between the side walls 11 and rim 12 of the end cap. The result is a moisture proof metal to plastic bond and shrink fit of the end caps on the ends of the case 7 which makes nondestructive removal of the end caps impossible unless the end caps are heated.

As the end caps are forced into place, the electrode extensions 3, 5 are matted into compressive contact with the bottom walls 10 as shown at the right in FIG. 2. While this provides adequate electrical connection, if the electrodes 2 and 4 are tin foil, the contact of the heated bottom wall 10 of the capacitor with the matted extensions 3, 5 of the electrodes also effects a soldered connection. In FIG. 2 the bottom wall 10 is shown in contact with the electrode extensions 3. After assembly there would be a similar contact with the electrode extensions 5. The matting of the electrode extensions may be a separate operation preceding the end cap assembly.

What is claimed as new is:

1. A hermetically sealed capacitor having a body of tightly wound dielectric and electrode convolutions with with an electrode connection at each end of the body, a tubular thermoplastic case embracing the body, and cup shaped imperforate metal end caps closing the ends of the case and making electrical connection to said electrode connections, said end caps prior to assembly being heated to a temperature above the melting point of the thermoplastic and having side walls of inside diameter under size compared to the outside diameter of the ends of the case and said end caps while heated being forced onto the ends of the case to fuse the plastic into conforming contact with the side walls and provide a metal to fused plastic seal with the associated ends of the plastic case.

2. The capacitor of claim 1 in which at least one end cap has a rim flaring outwardly from its side wall and a bead of fused plastic is formed between said rim and the associated end of the case as the cap is forced onto the case.

References Cited by the Examiner

UNITED STATES PATENTS 3,107,179  10/1963  Kohring _____ 29—155.71 X
3,150,300  9/1964  Schils et al. _____ 317—260 X ROBERT K. SCHAEFER, *Primary Examiner.*

JOHN F. BURNS, *Examiner.*

D. J. BADER, *Assistant Examiner.*